(12) United States Patent
Cray et al.

(10) Patent No.: US 7,106,658 B1
(45) Date of Patent: Sep. 12, 2006

(54) NAVIGATION SYSTEM AND METHOD USING DIRECTIONAL SENSOR

(75) Inventors: Benjamin A. Cray, West Kingston, RI (US); Harold T. Vincent, II, North Kingstown, RI (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 121 days.

(21) Appl. No.: 11/042,004

(22) Filed: Jan. 27, 2005

(51) Int. Cl.
*G01S 3/80* (2006.01)
(52) U.S. Cl. ...................................... 367/119; 367/902
(58) Field of Classification Search .............. 367/902, 367/118, 119, 128, 99
See application file for complete search history.

(56) References Cited

U.S. PATENT DOCUMENTS

2005/0219950 A1* 10/2005 Rowe .......................... 367/118

* cited by examiner

*Primary Examiner*—Dan Pihulic
(74) *Attorney, Agent, or Firm*—James M. Kasischke; Jean-Paul A. Nasser; Michael P. Stanley

(57) ABSTRACT

An apparatus for determining a position includes a source which transmits a signal having a source position and a transmission time coded therein. A sensor having a directional beam pattern is positioned at the location of interest. A signal processor steers the directional beam pattern of the sensor in order to determine the direction to the signal source. A sensor processor uses a clock to find a receipt time of the signal. The transmission time and source position is decoded from the signal. The position of interest is calculated from the receipt time, transmission time, direction, and source position. A method is also provided.

13 Claims, 1 Drawing Sheet

NAVIGATION SYSTEM AND METHOD USING DIRECTIONAL SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to a method and apparatus for vehicle navigation. More specifically the invention relates to a method and apparatus for obtaining navigational information in an underwater vehicle using a single vector sensor on the vehicle and a single transducer positioned in the environment.

(2) Description of the Prior Art

Obtaining precise navigational coordinates is a longstanding problem in underwater vehicles. Conventional global positioning systems (GPS) rely on radio wave reception from satellites to establish navigational coordinates, but bodies of water block all but the lowest radio frequencies. Accordingly, underwater vehicles must either surface an antenna or find some other method for obtaining navigational information.

Acoustic pressure sensing hydrophones are commonly used in manned and unmanned underwater vehicle applications. These non-directional sensors receive sound equally from all directions. To obtain directivity, the hydrophones are configured in an array consisting of many elements. The array assembly feeds acoustic information to signal processors for creating beam patterns that have directionality. The directionality of the beam is controlled by the relative size of the array to an acoustic wavelength. Thus, higher frequency acoustic wavelengths are used to increase the directionality. The useful frequency band of the array in a small vehicle, such as an unmanned vehicle, is limited to high frequencies; however, these high frequencies attenuate over a short distance thereby reducing the useful navigation capabilities.

Acoustic vector sensors have been developed which measure non-directional acoustic pressure and vector acoustic velocity components of an acoustic signal. Three vector acoustic velocity components are measured orthogonally. These vector components can be electronically steered to provide increased or decreased sensitivity at a given location.

One current underwater navigational system uses a single omnidirectional pressure sensor on a vehicle and four transponders. Utilizing technology known as hyperbolic multilateration, one can get an x, y, z position fix from the range to each transponder. This technique is similar to that used in the Global Positioning System (GPS). However, the system is limited to a relatively high frequency (7 kHz to 40 kHz) which reduces the operational range from the transducers.

Another current navigational system uses a high frequency array of sensors on the vehicle. Two transponders must be positioned in the environment to get an x, y, and z position fix. Triangulation is used to obtain directional information to the transponders. The frequency used is greater than 20 kHz, limiting the range. This system is expensive because of the needed array.

Another known navigational system utilizes a GPS buoy which acts as a relay to communicate to underwater vehicles by using an acoustic communication link. This system requires deployment of the GPS buoy within communication range of the underwater vehicle. The GPS buoy is further limited by the existing surface sea state.

SUMMARY OF THE INVENTION

This invention provides an apparatus for determining a position. The invention includes a source which transmits a signal having a source position and a transmission time coded in the signal. A sensor having a directional beam pattern is positioned at the location of interest. A signal processor steers the directional beam pattern of the sensor in order to determine the direction to the signal source. A sensor processor uses a clock to find a receipt time of the signal received by the sensor and decodes the transmission time and source position from the signal. The position of interest is calculated from the receipt time, transmission time, direction, and source position. A method is also provided.

As provided, this invention utilizes low frequency sensors to determine the position of an acoustic source in order to estimate the range, bearing and elevation angle of the source from the directional receiver.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
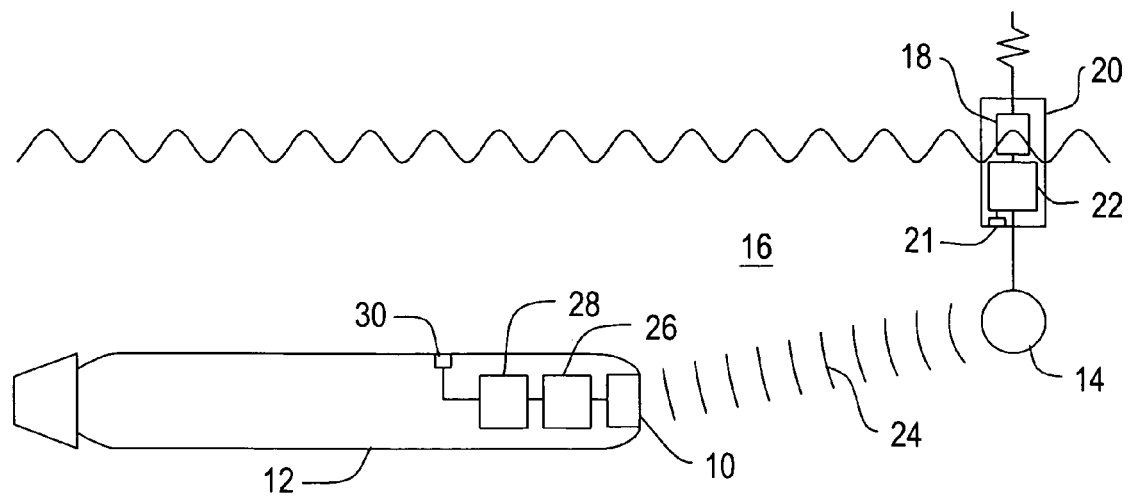
FIG. 1 is a diagram of a undersea vehicle receiving a navigational signal from a source.

FIG. 1 shows a diagram of the current invention. This invention uses a single directional sensor 10 that can be positioned on an underwater or surface vehicle 12. At least one acoustic transponder 14 is positioned in the environment 16. Transponder 14 is in communication with a position information source such as a global positioning system receiver 18 onboard a buoy 20. Environmental sensors 21 and a source processor 22 can also be onboard buoy 20. Source processor 22 must include a clock to provide an exact time signal. The transponder 14 radiates a coded acoustic signal 24. The signal 24 can be modulated to transmit the x, y, z coordinates of the origin and transmission time. Modulation can be by means of any known modulation including frequency, amplitude, or the like. Other information can also be transmitted. This can include environmental information such as water temperature and salinity obtained from environmental sensors 21. The signal 24 is received at the sensor 10 on the vehicle 12. The sensor 10 is joined to a signal processing system 26 on vehicle 12. Signal processing system 26 match filters the signal 18 to reject signals from other transponders or sources. A sensor processor 28 is also positioned on vehicle 12. Sensor processor 28 includes a clock synchronized with the source processor 22 clock. Sensor processor 28 can also be joined to receive temperature and salinity data from sensors 30 positioned on vehicle 12. The signal processing system 26 calculates the bearing angle and elevation angle from the vehicle 12 to the transponder 14 using the measured acoustic intensity vector of the received signal 24. Sensor processor 28 calculates distance between the transponder 14 and sensor 10 using the one-way time delay from signal transmission and the speed of signal propagation through the environment.

Figure 2:
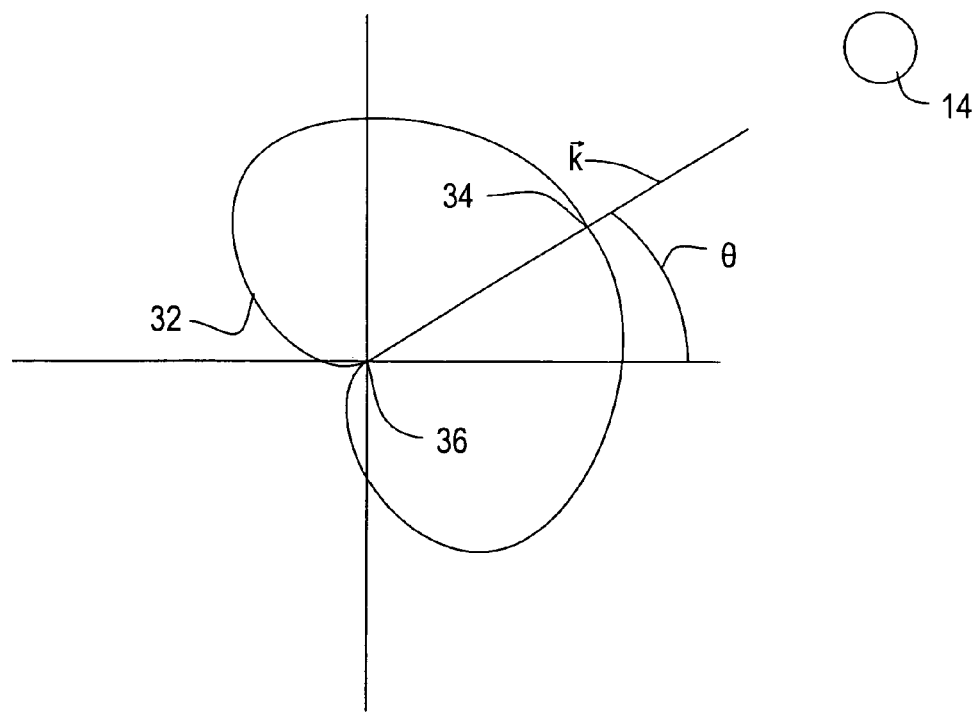
FIG. 2 is a polar plot of the beam pattern of a directional sensor and source used in this invention.

FIG. 2 is a two dimensional polar graph showing the beam pattern 32 of acoustic vector sensor 10 having a lobe 34 and a null 36. Acoustic vector sensor 10 is preferably a single sensor having a uniform acoustic pressure sensor and three piezoelectric crystals with the crystals oriented to receive signals from a single orthogonal direction. The uniform acoustic pressure sensor within the acoustic vector sensor is used to resolve front/rear ambiguity. Acoustic vector sensors are directional and have been known to show 6.0 dB of gain when steered to the source 14. Because a single sensor is used, array sensor spacing does not create Nyquist-type frequency dependencies. An acoustic vector sensor typically has a cardioid beam pattern. In the preferred embodiment, the direction from the sensor to the transponder is determined by steering the lobe or maximum part 34 of the beam pattern of the sensor 10 toward the transponder 14. Steering a directional sensor is taught be U.S. Pat. No. 5,930,021 which is incorporated by reference herein. A direction vector $\vec{k}$ can be calculated from the steering position when signal has been maximized.

As an alternative the null 36 of the beam pattern 32 can be steered toward the transponder 14. This may be advantageous because the null 36 represents a sharp signal reduction whereas the signal fades gradually on either side of lobe 34. The bearing and elevation of the steered null 36 are the bearing and elevation from the vehicle to the transponder. FIG. 2 is shown in two dimensions for clarity, but this analysis will be preferably applied using three dimensions.

The received signal is decoded at the sensor processor to find the known location of the transponder and the time of transmission. The range from the sensor to the transponder can be calculated from the difference between the sensor processor clock and the time of transmission. Salinity and temperature information at the sensor, the source or both to enhance the accuracy of the calculation by more accurately providing the speed of sound in the environment. The vehicle's position is calculated from the known transponder coordinates, the range, the bearing angle, and the elevation angle.

The transponder can transmit its signal using any known modulation selected from phase modulation, frequency modulation, amplitude modulation or intensity modulation. Multiple transponders can be provided having different modulations. The transponders can transmit information other than coordinates and time. The transponders can be positioned on the surface, bottom or intermediate in the environment. A drifting or mobile transponder can receive GPS information from a satellite and encode this information for transmission.

What is claimed is:

1. A method of determining position comprising:
   transmitting a signal having a time of transmission and a source position coded therein;
   receiving the transmitted signal at a vector sensor having a directional beam pattern;
   steering the beam pattern of the vector sensor to determine the direction of the transmitted signal;
   decoding the time of transmission and the source position in the received signal; and
   calculating the position of the vector sensor based on the determined direction of the transmitted signal, and the decoded time of transmission and source position.

2. The method of claim 1 further comprising:
   measuring a temperature and salinity of the environmental fluid at the source position;
   wherein:
   transmitting further comprises coding the measured temperature and salinity in the signal;
   decoding further comprises decoding the measured temperature and salinity from the received signal; and
   calculating further comprises utilizing the decoded measured temperature and salinity to increase the accuracy of the calculated position.

3. The method of claim 1 further comprising:
   measuring a temperature and salinity of the environmental fluid at the vector sensor position; and
   wherein calculating further comprises utilizing the measured temperature and salinity to increase the accuracy of the calculated position.

4. The method of claim 1 wherein the step of steering the beam pattern is performed by steering a null in the beam pattern to the direction of the transmitted signal.

5. The method of claim 1 wherein the source position is precalculated.

6. The method of claim 1 further comprising the step of obtaining a source position utilizing a global positioning system receiver.

7. An apparatus for determining a position comprising:
   a source having a source processor and a transducer for transmitting a signal having a source position and a transmission time coded therein;
   a sensor having a directional beam pattern for receiving said transmitted signal;
   a signal processor joined to said sensor and being capable of steering the directional beam pattern of said sensor and determining a direction to a transmitted signal thereby;
   a sensor processor joined to said signal processor having a clock therein, said clock being capable of providing a receipt time of the signal received by said sensor, said sensor processor being capable of decoding the transmission time and source position coded in a received signal, and utilizing said receipt time, said transmission time, said direction, and said source position to determine the position.

8. The apparatus of claim 7 wherein the source is positionable on the bottom of a body of water.

9. The apparatus of claim 7 further comprising a buoy supporting said source.

10. The apparatus of claim 9 further comprising:
    a global positioning system antenna positioned on said buoy; and
    a global positioning system receiver joined to said global positioning antenna and to said source for providing the source position.

11. The apparatus of claim 7 further comprising:
    a temperature sensor in communication with said source processor; and
    a salinity sensor in communication with said source processor whereby said processor can encode said temperature and said salinity in said signal, and said sensor processor being capable of decoding said encoded temperature and salinity and utilizing said temperature and salinity for increasing the accuracy of the determined position.

12. The apparatus of claim 7 further comprising:

a first temperature sensor in communication with said sensor processor for providing a first temperature; and a first salinity sensor in communication with said sensor processor for providing a first salinity whereby said sensor processor can utilize said first temperature and first salinity for increasing the accuracy of the determined position.

13. The apparatus of claim 12 further comprising:

a second temperature sensor in communication with said source processor for providing a second temperature; and a second salinity sensor in communication with said source processor for providing a second salinity whereby said processor can encode said second temperature and said second salinity in said signal, said sensor processor being capable of decoding said encoded second temperature and second salinity, and said sensor processor utilizing said first and second temperatures and first and second salinities for increasing the accuracy of the determined position.

* * * * *